US006422522B1

(12) United States Patent
Woollen

(10) Patent No.: US 6,422,522 B1
(45) Date of Patent: Jul. 23, 2002

(54) STAND FOR SUPPORTING A MUSICAL INSTRUMENT

(76) Inventor: Jeffrey K. Woollen, 17115 Vashon Hwy. SW., Vashon, WA (US) 98070

(*) Notice: Subject to any disclaimer, the term of this patent is extended or adjusted under 35 U.S.C. 154(b) by 0 days.

(21) Appl. No.: 09/587,469

(22) Filed: Jun. 5, 2000

(51) Int. Cl.[7] .......................... F16M 11/38; G10D 3/00

(52) U.S. Cl. ........................ 248/166; 211/85.6; 84/327

(58) Field of Search ......................... 248/166, 463–465, 248/454–456, 169–171, 683, 688, 518, 176.1, 126, 351, 354.5, 354.6, 441.1, 443, 444, 447, 457, 459; 211/85.6; 84/327, 280, 291, 453

(56) References Cited

U.S. PATENT DOCUMENTS

| | | | | | |
|---|---|---|---|---|---|
| 1,673,205 | A | * | 6/1928 | Romao | 84/327 |
| 1,684,912 | A | * | 9/1928 | Dunklau | 84/327 |
| 3,866,877 | A | * | 2/1975 | Thompson | 248/96 |
| 3,958,786 | A | * | 5/1976 | Mann | 248/176.1 |
| 4,036,462 | A | * | 7/1977 | Sheftel | 248/166 |
| 4,037,815 | A | * | 7/1977 | DeLano | 248/285 |
| 4,582,282 | A | * | 4/1986 | Gracie | 84/327 |
| 4,691,610 | A | * | 9/1987 | Gilbert | 84/327 |
| 4,693,161 | A | | 9/1987 | Uhrig | 84/327 |
| 4,742,751 | A | * | 5/1988 | Cherry | 84/327 |
| 4,966,062 | A | * | 10/1990 | Driggers et al. | 84/327 |
| 5,036,974 | A | * | 8/1991 | Ross, Jr. | 248/96 |
| 5,082,218 | A | * | 1/1992 | Hoffman | 248/96 |
| 5,165,634 | A | * | 11/1992 | Garbuzov et al. | 248/166 |
| 5,197,701 | A | | 3/1993 | Olson | 248/166 |
| 5,375,497 | A | * | 12/1994 | Pirchio et al. | 84/327 |
| 5,497,689 | A | * | 3/1996 | Hoshino | 84/327 |
| 5,516,064 | A | * | 5/1996 | Hsieh | 248/96 |
| 5,622,344 | A | * | 4/1997 | Gracie | 248/166 |
| 5,713,547 | A | * | 2/1998 | Yu | 248/166 |
| 5,973,244 | A | * | 10/1999 | McCulloch | 84/327 |
| 6,145,801 | A | * | 11/2000 | Herring, Jr. | 211/85.6 |
| 6,252,150 | B1 | * | 6/2001 | Johnson | 84/327 |

* cited by examiner

*Primary Examiner*—Daniel P. Stodola
*Assistant Examiner*—Jennifer E. Novosad

(57) ABSTRACT

A stand (10) for supporting a musical instrument (12), such as a guitar, in an upright position when not in use and for retention on the instrument when the instrument is in use. The stand comprises a mounting base (22) secured to the rear surface of the instrument (18), and a support member (24) pivotally connected to the mounting base (22) and containing first and second foot portions (34A & B) and third foot portion (56). The pivotal attachment allows the support member (24) to be transitioned between a storage position adjacent the rear surface of the instrument (18) and a deployed position spaced away from the rear surface of the instrument (18) where, together with the bottom edge of the instrument (20), the first and second foot portions (34A & B) act to support the instrument (12). Third foot portion (56) engages a floor or other support surface providing fixative force to the support member allowing the instrument and mounting base to be pivoted away from the support member to the deployed position without the need to touch the stand. The support member (24) is spring-loaded and automatically returns to the storage position when the instrument (12) is lifted for use.

7 Claims, 5 Drawing Sheets

STAND FOR SUPPORTING A MUSICAL INSTRUMENT

CROSS-REFERENCE TO RELATED MATERIAL

Not applicable.

BACKGROUND—FIELD OF INVENTION

This invention relates to musical instrument stands, specifically to a musical instrument stand for enabling the instrument to remain in an upright position when not in use and which is retained on the instrument when the instrument is in use.

BACKGROUND—DESCRIPTION OF PRIOR ART

Musicians are often faced with the challenge of temporarily supporting their instrument when it is not being played. Instruments such as guitars are subject to potential damage if simply laid flat on the floor, so it is common practice to lean the neck or head of the instrument against a piece of furniture or a wall.

Leaning the neck of such an instrument against a piece of furniture or the like often results in the upper part of the instrument sliding laterally, causing the entire instrument to fall to the floor, again resulting in damage to the instrument. Leaning the head of such an instrument against a wall or a piece of furniture has the added disadvantage of potentially putting the instrument out of tune due to the tuners in the head coming in contact with the wall or furniture.

Conventional stands for musical instruments have been free standing devices which rest on the floor, into which the instrument is placed when not in use. While some of these stands are collapsible to some degree, they still represent an additional piece of equipment the musician must deal with, requiring time, effort and space to transport, store, deploy and use.

Two types of stands which are retained on the musical instrument in a collapsed configuration while the instrument is being played, and which can then be deployed as a stand when the instrument is not in use have been proposed. Both require a degree of manual manipulation to either deploy or to store. In addition, neither addresses the fact that many guitars and other like instruments have back surfaces which are bowed rather than flat.

One such device, U.S. Pat. No. 5,197,701 by Olson is a mechanically complex device. While it does include spring loaded legs which are automatically released when the bottom end of the guitar is placed on the floor, it requires that the same legs be manually forced back into their housing, against the pressure of the springs, before the musical instrument can be used. In the case of the guitar or other similar instrument, there is no practical way to hold the instrument to apply an opposing force necessary to accomplish this act. These instruments can easily be held by their neck, but this would be difficult due to the leverage provided by the length of the neck. it is not easy to adequately grip such an instrument in the midst of it's body, where the opposing force is required.

In addition to the disadvantage of this difficulty in returning the collapsible legs to their stored position, the device suffers from an overly complex mechanical design, causing a number of other disadvantages:

(a) The tooling, manufacture and assembly for the device would be expensive. The design requires numerous custom made parts which need to adhere to close tolerances in order for the device to function properly. The labor required to assemble the numerous parts would be relatively costly.

(b) The mechanical complexity of the device would render it subject to potential breakdowns requiring repair or replacement.

(c) Several sliding and pivoting parts could require periodic lubrication. Lubricants attract and retain dust and dirt, and this dust and dirt would be easily transferred to the clothing of the user, especially when playing the instrument, at which time the device is in actual contact with the user's clothing.

(d) The mechanical complexity of the device contributes to an overall bulky and obtrusive appearance. This has both an aesthetic and a practical impact: Aesthetic since the device is visually obtrusive, and practical since the bulkiness of the device causes interference against the user's body when the instrument is being played.

(e) The straight legs and housing would not accommodate the curvature of a bowed-back instrument, rendering the device useless on said instruments.

The other device, U.S. Pat. No 4,693,161 by Uhrig, is a simpler device, but suffers from several major disadvantages:

(a) The device is attached to the musical instrument by the means of the screws which hold the neck of the instrument to the instrument body. Loosening these screws in order to mount the device can cause misalignment of the neck and body of the instrument, resulting in a number of functional problems in the instrument.

(b) The supporting leg(s) is not spring mounted, thus manual manipulation is required for both deployment and collapsing of the device. while this solves one of the problems of the device previously cited, it adds another level of inconvenience to the user.

(c) Because the device is attached by screws at a predetermined point on the instrument, and the length of it's supporting leg is not adjustable, the device would be compatible only with those instruments where the distance from the neck-to-body attaching screws to the bottom of the instrument happens to match the length of the device's leg.

(d) The requirement of attaching the device at the point where the neck meets the body of the instrument requires the device span the entire length of the instrument body, resulting in a device that is both bulky and obtrusive.

(e) The straight legs would not accommodate the curvature of a bowed-back instrument, rendering the device useless on said instruments.

(f) The requirement to attach the device by means of the screws which attach the neck to the body of the instrument would prevent the device from being used on those instruments, such as hollow-body acoustic guitars and the like, which do not incorporate screws as a means of attachment of the neck to the body of the instrument.

(g) The attachment by means of screws to any location on an instrument other than where screws already exist would result in the defacing of the instrument.

SUMMARY

The present invention pertains to a stand for supporting a musical instrument, such as a guitar, in an upright position when the instrument is not being used. The stand remains attached to the instrument when it is being played. The device is both deployed and collapsed without direct manipulation by the user. The stand comprises a mounting base having a surface adjacent to and secured to the rear surface of the instrument by non-invasive means such as by suction cups. A support member extends down from an upper portion of the mounting base to engage a supporting surface, such as a floor. The bottom of the support member includes foot portions which together with the bottom portion of the musical instrument define a plane for supporting the instrument in the upright position. The lower portion of the support member may optionally be canted relative to the upper portion in order to accommodate instruments having a bowed back such that despite a slight bow in the back surface of the instrument, the foot portions of the support member still rest proximate to the rear surface of the instrument when in closed position.

The support member is pivotally connected to the mounting base to permit it to be moved between a storage position where the foot portions are adjacent to the musical instrument, and a deployed position spaced away from the musical instrument where the bottom of the instrument and the foot portions form a tripod-like support. When in the storage position, one or more of the foot portions extend slightly beyond the bottom edge of the instrument, thus allowing touch free deployment of the device by holding the instrument by the neck, lowering the upright instrument to the floor until the foot portion comes in contact with the floor, where friction fixes the position of the foot portion relative to the floor. By then pivoting the instrument on the point where the support member is pivotally joined to the mounting base, the bottom of the instrument is moved away from the foot portion until the stand's preset stop point is reached, at which point the bottom of the instrument is lowered to the floor. This leaves the device in the deployed position. The support member is spring-loaded such that when the instrument is lifted from the floor, the support member automatically returns itself to the storage position.

It is therefore an object of the present invention to provide a support stand which is attached to a musical instrument, such as a guitar, for supporting the instrument in an upright position when the instrument is not in use, which can be stored unobtrusively on the instrument in a closed state while the instrument is being played, and be conveniently transitioned between the storage and the deployed positions without direct manipulation by the user.

OBJECTS AND ADVANTAGES

Accordingly, several objects and advantages of my invention are:

(a) to provide a stand for a musical instrument which allows for rapid, convenient deployment;

(b) to provide a stand for a musical instrument which stores unobtrusively on the instrument while the instrument is being played;

(c) to provide a stand for a musical instrument which requires no direct manipulation by the user;

(d) to provide a musical instrument stand which is mechanically simple and inexpensive to produce;

(e) to provide a musical instrument stand which uses a minimal number of parts;

(f) to provide a musical instrument stand which requires little or no maintenance;

(g) to provide a musical instrument stand which requires no lubrication;

(h) to provide a musical instrument stand which will fit instruments of varying sizes, types and shapes, including both flat-backed and bow-backed instruments, and both solid-body and hollow-body guitars;

(i) to provide a musical instrument stand which can be easily removed and/or reattached from/to the same or a different instrument;

(j) to provide a musical instrument stand which attaches to the instrument without disturbing the instrument's integrity or appearance; and (k) to provide a musical instrument stand which is sleek, lightweight, compact, and thus easy to transport and store.

Further objects and advantages of my invention will become apparent from a consideration of the drawings and ensuing description.

DRAWING FIGURES

REFERENCE NUMERALS IN DRAWINGS

| | | | |
|---|---|---|---|
| 10 | stand | 12 | musical instrument |
| 14 | instrument body | 16 | instrument neck |
| 18 | instrument rear surface | 20 | instrument bottom edge |
| 22 | mounting base | 23 | mounting base front surface |
| 24 | support member | 26 | support member first end |
| 28 | support member second end | 30A | left time |
| 30B | right tine | 32 | bifurcated tail |
| 34A | first foot portion | 34B | second foot portion |
| 36A, B, C | suction cups | 38A, B | recesses |
| 40A, B | springs | 42A, B | protrusions |
| 44A, B | protrusions | 46 | pin |
| 48A, B | stop surfaces | 50A, B | stop surfaces |
| 52A, B | predetermined angle | 53 | point of bend |
| 54 | predetermined angle | 56 | third foot portion |
| 60 | spring | | |

DESCRIPTION

Figure 1:
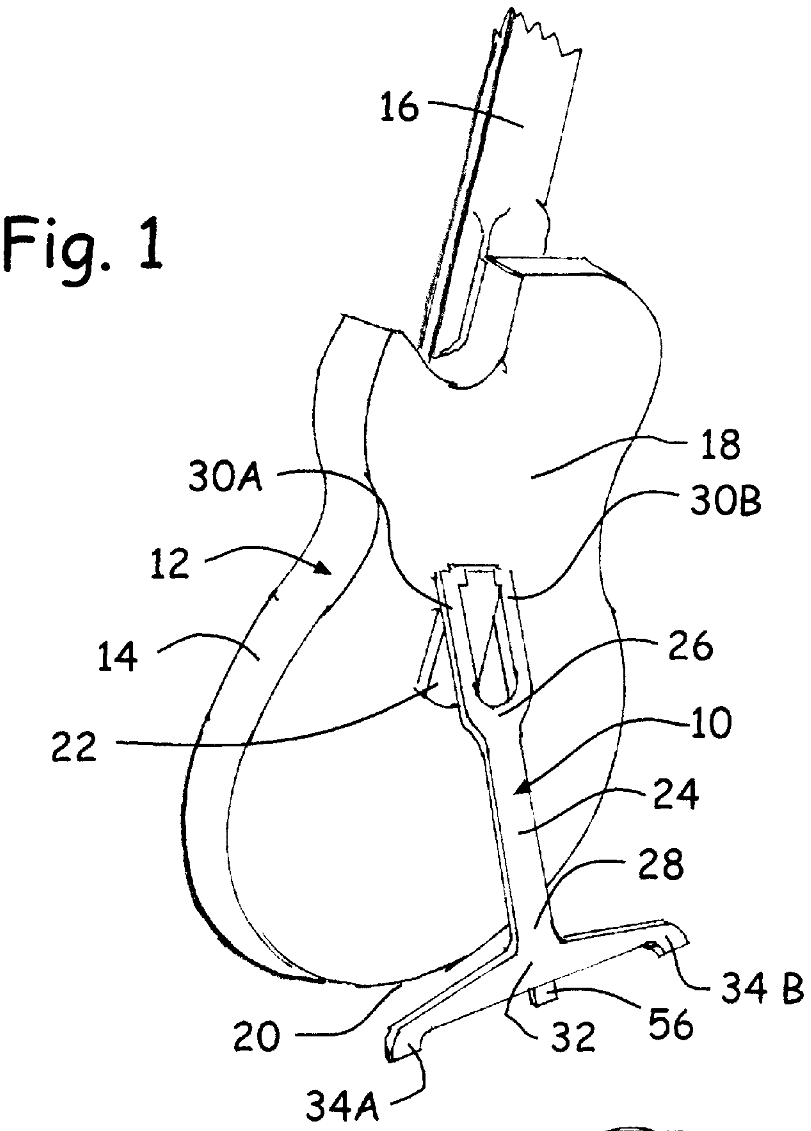
FIG. 1 is a perspective view illustrating a guitar mounted on the stand with the stand in the deployed position.
Figure 2:
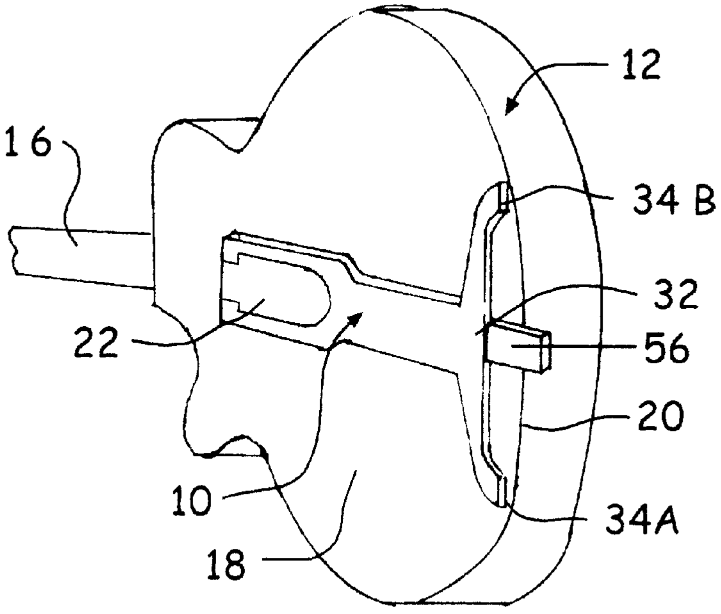
FIG. 2 is a perspective view of a guitar mounted on the stand with the stand in the storage position.
Figure 3:
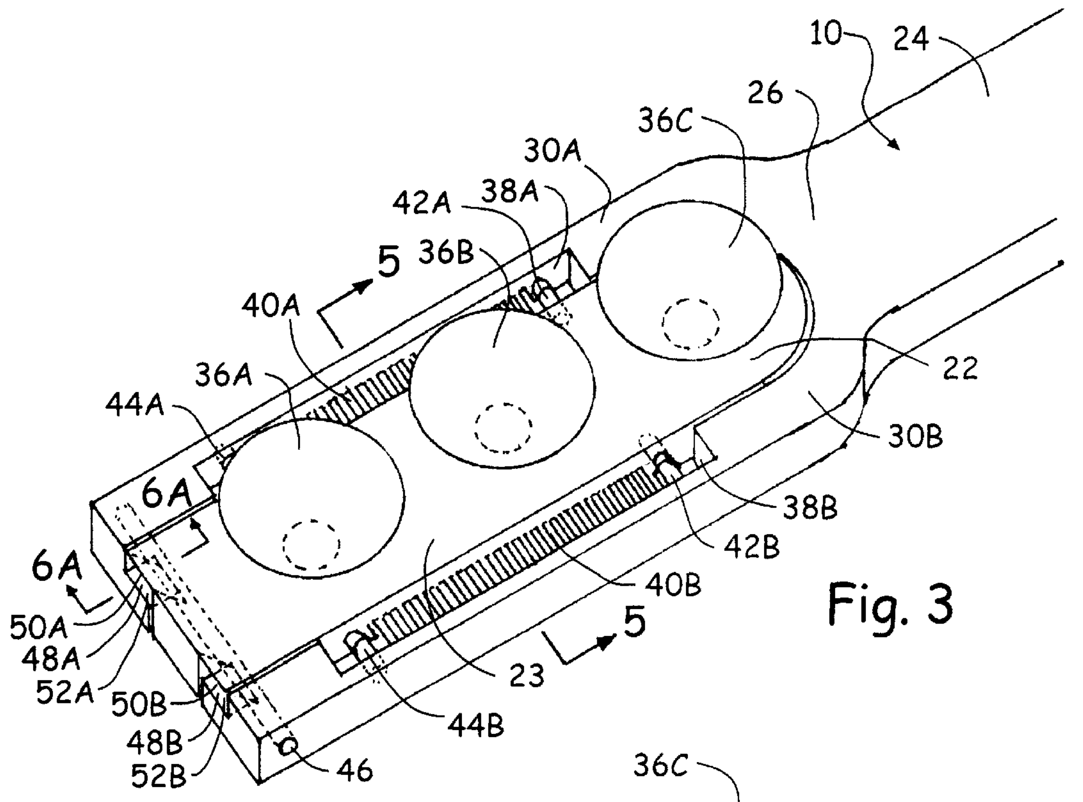
FIG. 3 is a perspective of the upper portion of the support member in the storage position, viewed from the side which mounts adjacent to the musical instrument, showing the spring closure mechanism and suction cups for mounting the device to the instrument.
Figure 5:
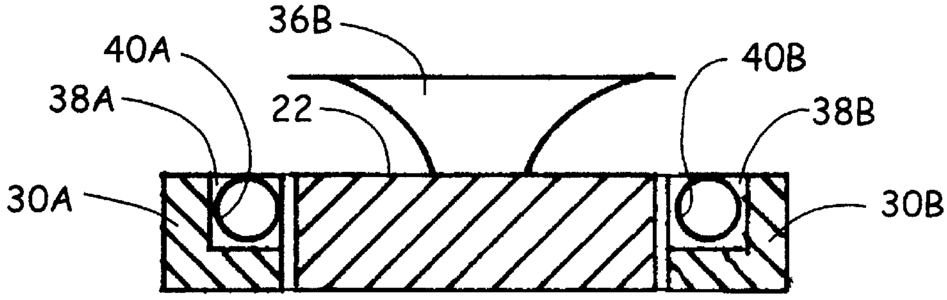
FIG. 5 is a cross-sectional view of the stand taken along line 5—5 of FIG. 3, showing the recesses in the support which encase the springs.
Figure 9:
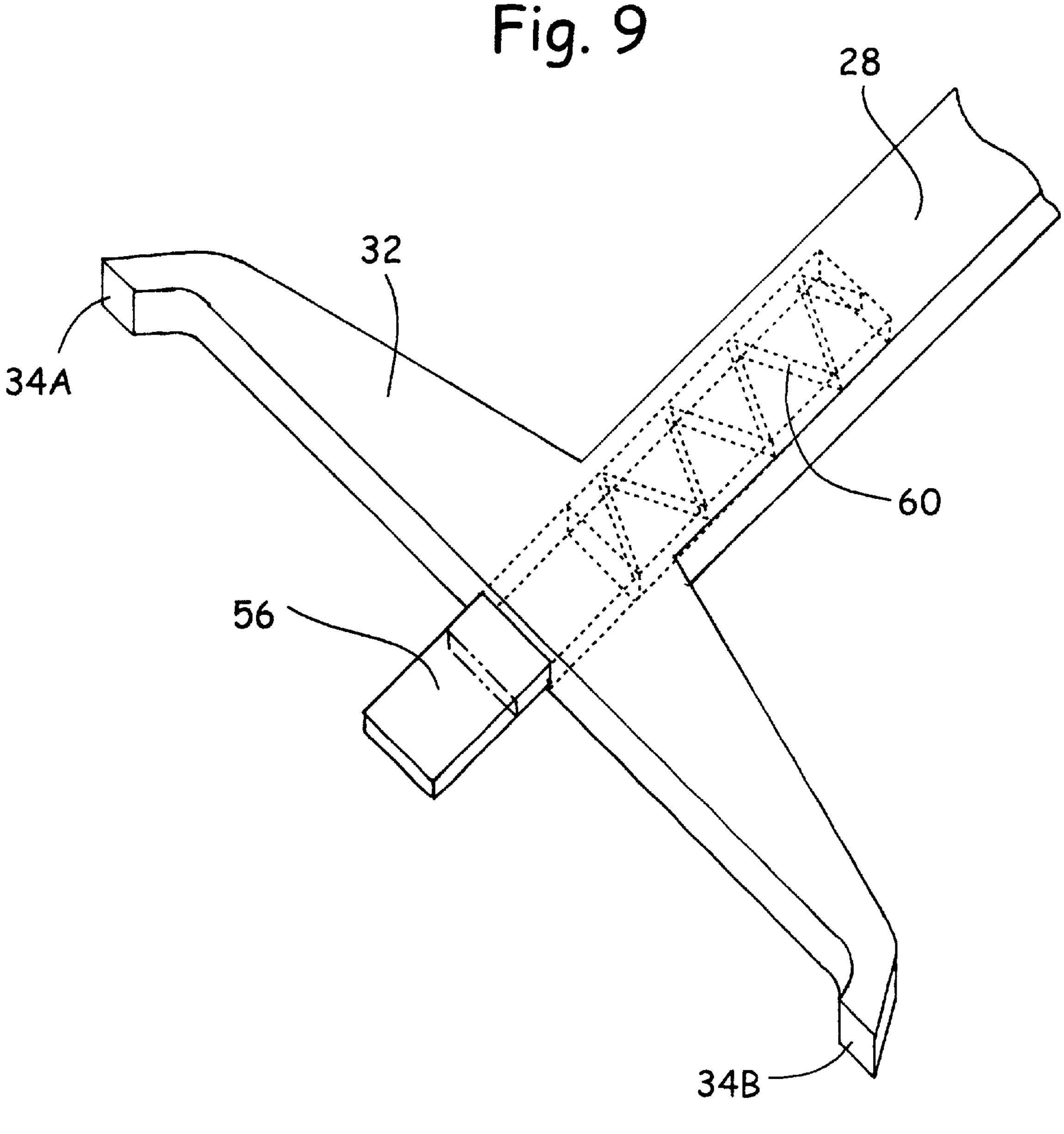
FIG. 9 is a perspective of the lower portion of the support member showing the third foot portion and spring.

In the preferred embodiment of the present invention illustrated in FIG. 1, a support stand, generally indicated at 10, is adapted for supporting a conventional guitar indicated at 12, in a generally upright position. Guitar 12 includes a body 14, and a neck 16. Body 14 includes a front portion (not shown), and a rear surface 18 which terminates at bottom edge 20. The stand 10 comprises a mounting base 22 and a support member 24. The support member includes a first end 26 and a second end 28. Support member first end 26 includes left tine 30A and right tine 30B which straddle mounting base 22. Support member second end 28 includes a bifurcated tail 32 terminating in first foot portion 34A, second foot portion 34B, and third foot portion 56. As shown in FIG. 9, third foot portion 56 is moveable relative to support member second end 28 a short distance between an extended position and a depressed position. Spring 60 returns third foot portion 56 to the extended position absent any contrary force. As shown in FIG. 2, when the musical instrument 12 is in use, support member 24 is positioned in a storage position adjacent to rear surface 18 such that foot portions 34A & B lie approximately even with instrument rear surface bottom edge 20, and third foot portion 56, in the extended position, extends a short distance beyond instrument rear surface bottom edge 20. As seen in FIG. 1, when the musical instrument 12 is not in use, support member 24 is spaced away from rear surface 18 in a deployed position. In this position, foot portions 34A & B together with bottom edge 20 form a tripod for support of instrument 12, and third foot portion 56 is in the depressed position. Referring now to FIG. 3, the undersides of mounting base 22 and support member upper portion 26 are shown in detail with instrument 12 removed therefrom, with stand 10 in the storage position. The mounting base 22 includes suction cups 36A, B & C attached to mounting base front surface 23 which mounts parallel to and adjacent to instrument rear surface 18 (as shown in FIG. 1). Tines 30A & B include recesses 38A & B into which springs 40A & B are received when the stand 10 is in the first, closed position. In FIG. 5, recesses 38A & B are seen in detail, containing springs 40A & B within tines 30A & B. Returning again to FIG. 3, springs 40A & B are attached at one end to protrusions 42A & B which project outward from mounting base 22. The other ends of springs 40A & B attach to protrusions 44A & B which project inward from tines 30A & B. Support member 24 is pivotally connected to mounting base 22 by means of pin 46. Tines 30A & B include stop surfaces 48A & B whose plane is a radius drawn from the centerline of pin 46 parallel to the plane of support member 24. Mounting base 22 includes stop surfaces 50A & B whose plane is a radius drawn from the centerline of pin 46 at predetermined angle 52A running towards surface 23 of mounting base 22.

Figure 6A:
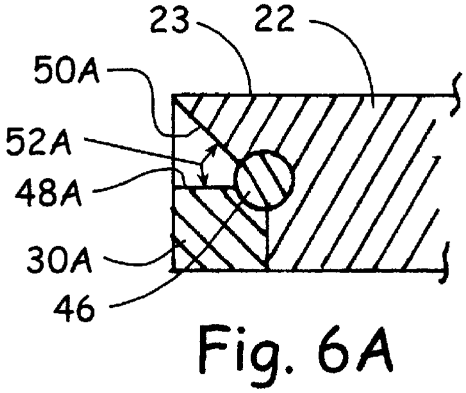
FIG. 6A is a cross-sectional view of the stand taken at line 6A—6A of FIG. 3, showing the stop surfaces with the device in the storage position.

FIG. 6A shows the relationship of stop surface 48A to stop surface 50A with the stand in the storage position. Predetermined angle 52A defines a range of non-interference between the surfaces to allow limited pivotal rotation of tine 30A relative to mounting base 22.

Figure 4:
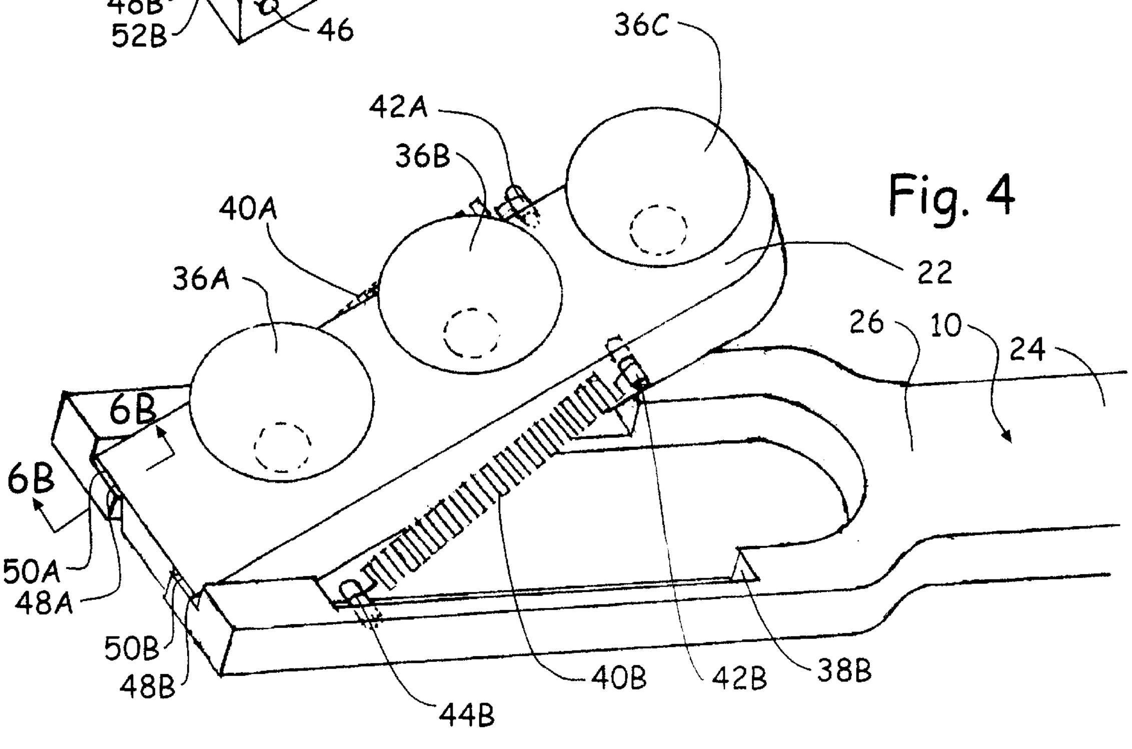
FIG. 4 is a perspective of the upper portion of the support member in the deployed position, showing the spring closure mechanism.
Figure 6B:
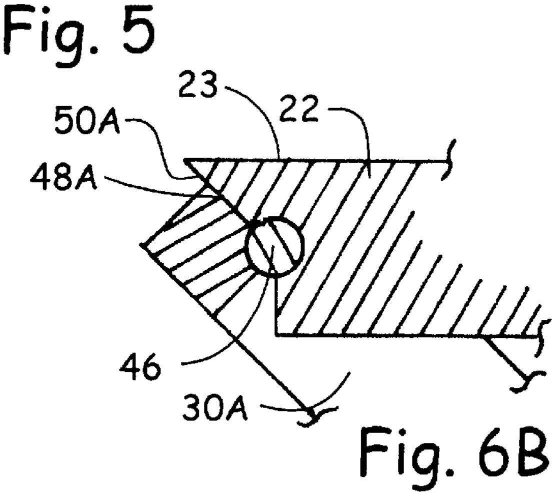
FIG. 6B is a cross-sectional view of the stand taken at line 6B—6B of FIG. 4, showing the stop surfaces with the device in the deployed position.

FIG. 6B shows the relationship of stop surface 48A to stop surface 50A with the stand in the deployed position, as illustrated in FIG. 4. In this position, surface 50A interferes with further movement of surface 48A, defining the maximum range of pivotal rotation between tine 30A and mounting base 22.

Figure 7A:
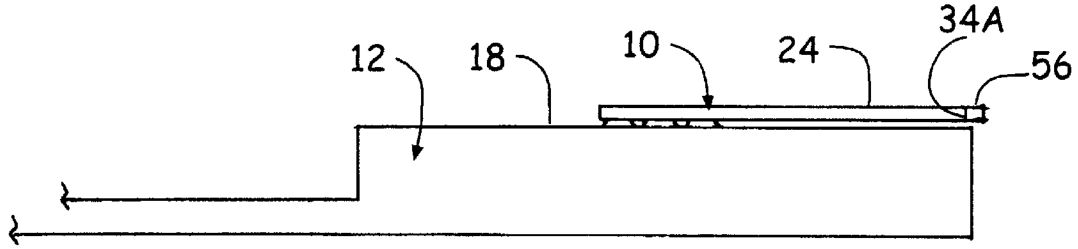
FIG. 7A is a side view of the stand mounted on a flat-backed instrument, showing the support member relative to the shape of the back surface of the instrument.

Referring now to FIG. 4, the undersides of mounting base 22 and support member upper portion 26 are shown in detail with instrument 12 removed therefrom, with the stand in the deployed position. In this position, springs 40A & B partially emerge from recesses 38A & B and are extended as protrusions 42A & B are moved more distant from protrusions 44A & B, causing the springs to stretch. It is the the stretched springs which cause support member 24 to retract to the storage position absent any force to the contrary. FIG. 7A is a side view of guitar 12 showing a flat back surface 18 with stand 10 mounted thereon in the storage position. In this embodiment, support member 24 is straight along its length.

Figure 7B:
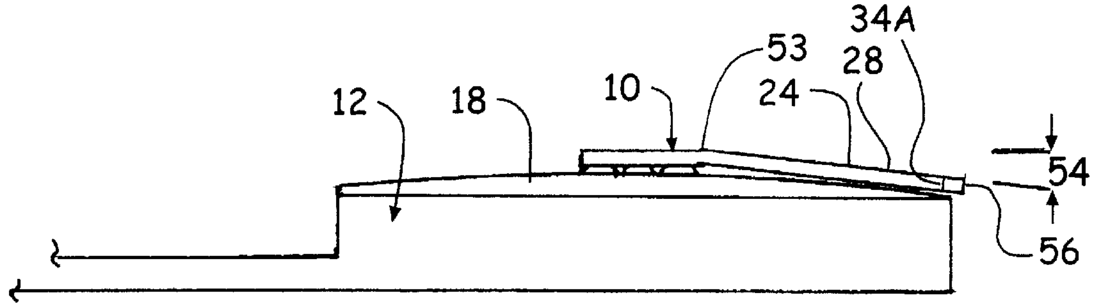
FIG. 7B is a side view of the stand mounted on a bow-backed instrument, showing the alternative canted support member relative to the shape of the back of the instrument.

FIG. 7B is a side view of guitar 12 showing a bow-backed surface 18 with stand 10 mounted thereon in the storage position. In this alternative embodiment, sup port member second end 28 is canted at angle 54 relative to the support member first end 26 at point 53, allowing support member second end 28 to rest proximate to bow-backed surface 18.

OPERATION—PREFERRED EMBODIMENT

To use the instrument stand 10, one first attaches stand 10 to back surface 18 of instrument 12 by depressing suction cups 36A, B & C against back surface 18. Position ing of the stand 10 relative to instrument body 14 is such that foot portionsb lie approximately even with instrument rear surface bottom edge 20, while the tip of third foot portion 56 overhangs bottom edge 20 by a short distance.

Figure 8A:
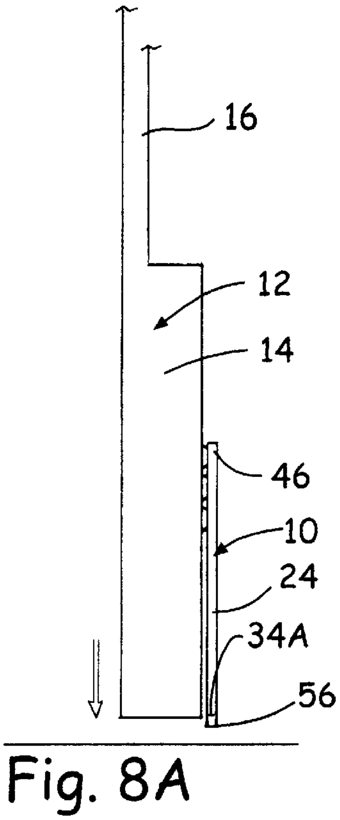
FIG. 8A is a side view of the stand mounted on a guitar being held in position just above the floor surface as the first stage of the deployment operation.
Figure 8B:
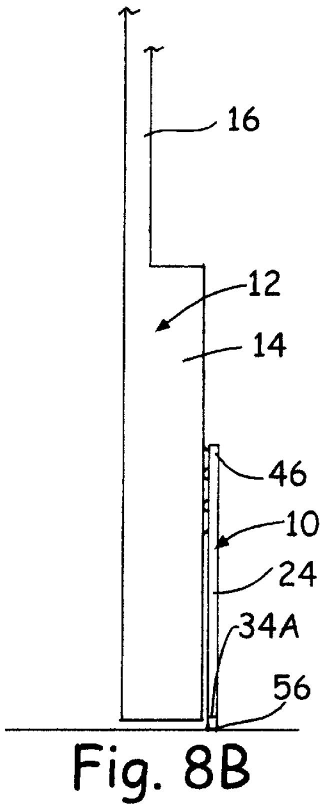
FIG. 8B is a side view of the stand mounted on a guitar showing the third foot portion contacting the floor surface as the second stage of the deployment operation.
Figure 8C:
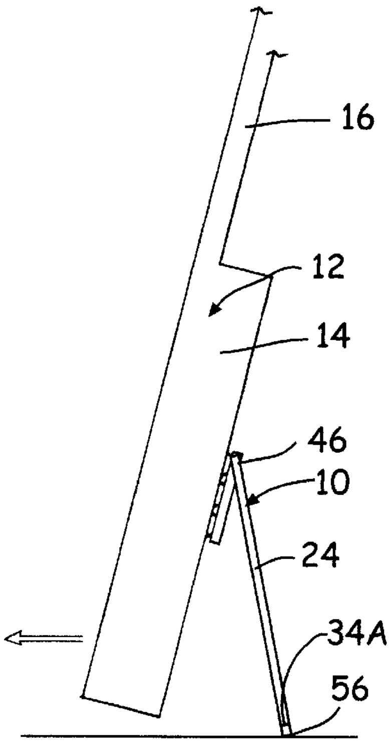
FIG. 8C is a side view of the stand mounted on a guitar showing the guitar body rotated away from the support member as a third stage of the deployment operation.
Figure 8D:
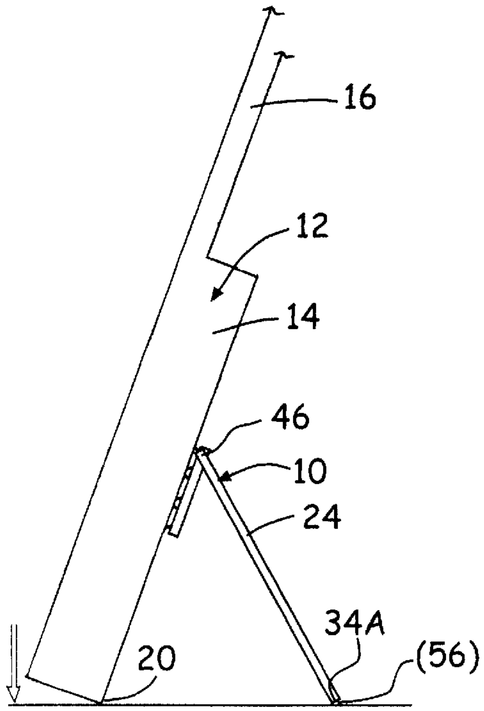
FIG. 8D is a side view of the stand mounted on a guitar showing the guitar bottom edge lowered to the floor surface as the fourth and final stage of the deployment operation.

As illustrated in FIG. 8A, once stand 10 has been attached, one holds the instrument 12 by gripping neck 16, positioning instrument 12 in a generally upright position above the floor or other supporting surface. In this position, instrument 12 is lowered until third foot portion 56 comes into contact with the floor or other supporting surface, as shown in FIG. 8B, where friction between the tip of third foot portion 56 and said floor fixes the position of third foot portion 56 relative to said floor. Now, as shown in FIG. 8C, instrument 12 is pivoted along the centerline of pin 46 as the bottom edge 20 is moved away from support member 24, stretching springs 40A & B (Shown in FIG. 4) until the limit of pivotal rotation determined by predetermined angle 52A & B (Shown in FIG. 6A) between stop surfaces 48A & B and 50A & B (Shown in FIGS. 6A and 6B) is reached, bringing the stand 10 to the deployed position. At this point, as shown in FIG. 8D, bottom edge 20 is lowered to the floor. As this is done, the weight of the instrument bearing down on support member 24 causes third foot portion 56 to move from its extended position to its depressed position, allowing first and second foot portions 34A & B to come in contact with the floor surface where, together with instrument rear surface bottom edge 20 they form a tripod for support of the instrument.

Figure 8E:
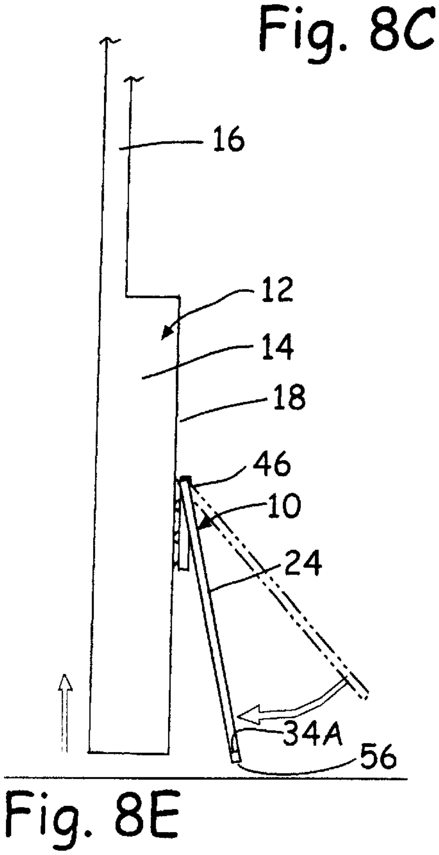
FIG. 8E is a side view of the stand mounted on a guitar showing the release and return of the support member to the storage position as the guitar is lifted from the floor surface.

As illustrated in FIG. 8E, when the instrument 12 is to be used, one grips instrument 12 by neck 16 and lifts instrument 12 together with stand 10 from the floor or other supporting surface, releasing foot portions 34A & B from their fixed position, allowing springs 40A & B (Shown in FIG. 4) to retract support member 24 back to the storage position adjacent to back surface 18. At the same time, third foot portion 56 returns to its extended position.

CONCLUSION, RAMIFICATION AND SCOPE OF INVENTION

Thus the reader will see that the instrument stand of the invention provides a simple, convenient device which is easy to use and will fit a variety of instruments. It requires little manipulation by the user, and may be attached and removed easily from the instrument without damage thereto. When the instrument is being played, the stand is unobtrusively stored on the back of the instrument. The stand's design is simple and inexpensive to produce and maintain.

While my above description contains many specificities, these should not be construed as limitations on the scope of the invention, but rather as an exemplification of one preferred embodiment thereof Many other variations are possible. For example, the number of suction cups may be varied, or the mounting block could be configured in a "T" relationship to the support member instead of in parallel. The device can be made of various rigid materials and in varying sizes. Torsional springs could be employed in place of the extension springs.

Accordingly, the scope of the invention should be determined not by the embodiments illustrated, but by the appended claims and their legal equivalents.

I claim:

1. A musical instrument stand for an instrument having a rear surface and a bottom edge, the stand comprising:

(a) a mounting base (22) having a first end, a second end, a rear surface and a front surface which defines a plane;

(b) attachment means (36A–C) disposed on the front surface of the mounting base for attaching the mounting base substantially parallel to the instrument rear surface;

(c) a support member (10) having a first end and a second distal end, a rear surface and a front surface defining a plane, whereby an opening is disposed adjacent the first end of the support member and extending between the front and rear surfaces thereof, whereby the first end of the support member is pivotally attached to the first end of the mounting base and the support member being rotatable between a storage position wherein the front surface of the support member lies substantially in the same plane as the front surface of the mounting base and the mounting base lies within the opening, thereby allowing the rear surface of the instrument to be disposed adjacent the front surface of the support member, and a deployed position wherein the support member is spaced away from the mounting base thereby defining a predetermined angle therebetween, and allowing the instrument bottom edge to rest on a horizontal surface so that the instrument is disposed at an angle relative to the horizontal surface;

(d) limiting means disposed adjacent the first end of the mounting base and the first end of the support member for limiting the pivotal rotation of the support member relative to the mounting base to the predetermined angle defined between the support member and the mounting base;

(e) retracting means (40A and 40B) disposed generally between the mounting base and the support member; and (f) engaging means located adjacent the second end of the support member and configured to rest on the horizontal surface, wherein when the support member is placed in the deployed position the engaging means imparts a fixating force on the support member to hold the support member in the deployed position and when the instrument is lifted the retracting means causes the support member to rotate towards the mounting base and into the storage position.

2. The stand of claim 1 wherein the attachment means comprises suction cups.

3. The stand of claim 1 wherein the second end of the support member comprises a bifurcated tail section which terminates in first and second foot portions spaced apart from one another by a predetermined distance.

4. The stand of claim 1 wherein said limiting means comprises:

(a) a stop surface integral with the first end of the support member; and (b) a facing stop surface integral with the first end of the mounting base, whereby the predetermined angle is defined between the stop surface and the facing stop surface so that when the support member is rotated to the predetermined angle the stop and facing stop surfaces interfere with one another to thereby prevent further rotation.

5. The stand of claim 1 wherein the retracting means comprises one or more springs.

6. The stand of claim 1 wherein the second end of the support member comprises a bifurcated tail section which terminates in first and second foot portions spaced apart from one another by a predetermined distance and the engaging means comprises the first and second foot portions.

7. The stand of claim 1 wherein the second end of said support member comprises a bifurcated tail section which terminates in first and second foot portions spaced apart from one another by a predetermined distance, and wherein said engaging means comprises a third foot portion extending from said support member approximately midway between said first and second foot portions, said third foot portion being movably attached to said support member such that said third foot portion can be moved between an extended position wherein said third foot portion extends beyond a line projected between said first and second foot portions by a predetermined distance, and a depressed position wherein said third foot portion is approximately even with said line, and wherein said movement between said extended position and said depressed position is resisted by one or more springs.

* * * * *